United States Patent Office 3,501,445
Patented Mar. 17, 1970

3,501,445
POLYACRYLATE THICKENERS AND COPOLYMERS USED TO PRODUCE SAME
Ellsworth E. Faust, Berkeley Heights, and Arnold G. Wilbur, Summit, N.J., assignors to Celanese Corporation, New York, N.Y., a corporation of Delaware
No Drawing. Filed Feb. 28, 1968, Ser. No. 708,748
Int. Cl. C08f 15/18, 27/24
U.S. Cl. 260—86.1                12 Claims

ABSTRACT OF THE DISCLOSURE

Improved water soluble polyacrylate thickeners are produced by saponifying copolymers comprising an alkyl acrylate and from 0.005 to 0.1% of an acrylate ester which contains, in addition to the acrylate ethylenic unsaturation, at least one additional substituent having monoethylenic unsaturation.

---

This invention relates to improved water soluble polyacrylate thickeners produced from novel copolymers and to their processing techniques. More particularly, the invention relates to an alkali salt of polyacrylic acid, to novel copolymers of an alkyl acrylate and an acrylate containing at least one other radical having monoethylenic unsaturation utilized to produce the alkali salts of polyacrylic acid and the methods to produce the polyacrylate thickeners and the novel copolymers.

A major use of alkali polyacrylate thickeners is to increase the viscosity of latexes such as natural rubber and carboxylated butadiene/styrene which essentially functions in carpet backcoatings as adhesives. It is, therefore, highly desirable to produce alkali polyacrylates, and especially sodium polyacrylates which will thicken, i.e., increase viscosities, of latexes in an improved manner yet not increasing the amount of thickener to be used.

Improved water soluble polyacrylate thickeners for latexes have been discovered which comprise an alkali salt of polyacrylic acid. The polyacrylic acid is produced from a polyalkyl acrylate having an inherent viscosity in the range from about 0.7 to about 2.9 preferably from about 0.7 to about 2.5, measured in 80 percent acetic acid. The polyalkyl acrylate, however, contains a very small amount of an acrylate ester which contains at least one other radical containing monoethylenic unsaturation. The acrylate ester appears to act as a cross-linking agent but the amounts which are used range from about 0.005 to 0.1 weight percent preferably from about 0.02 to about 0.06 weight percent based on the polyalkyl acrylates. At amounts in excess of 0.1 weight percent, desired results are not obtained. The amounts are exceptionally low for cross-linking since the amounts of cross-linking material in polymers normally require in excess of 0.5 weight percent. This is a unique feature of this invention.

To produce the improved thickeners for latexes, the polyalkyl acrylates must be reacted or saponified with alkali hydroxides to provide the desired product. A process is provided to produce a uniformly saponified polymer whereby the effeciency of the reaction is improved by the initial addition of a portion of the alkali hydroxide, i.e., 10 to 40 percent of the total amount in combination with 40 to 70 percent of the total water. The remainder of the alkali hydroxide and water is added at emulsion temperatures in the range from about 60° C. to about 90° C. in a uniform rate over a period of time sufficient to provide uniformly saponified product. If all of the alkali hydroxide is added in the initial stage a large amount of insolubles is produced which do not have the thickening properties.

The polymerization process for the copolymers of this invention is unique in that the polymerization is controlled to provide copolymers having an inherent viscosity in the range from about 0.7 to about 2.9, preferably from about 0.7 to about 2.5 measured in acetic acid. The polymerization of the alkyl acrylate and acrylate ester is conducted in the presence of water, a water soluble polymerization catalyst, and a surfactant at temperatures in the range from about room temperature to about 100° C. Temperatures of this reaction are critical since control of the inherent viscosities in the finished product are very important. The preferred processing technique is to utilize only a portion of the reactants, polymerize this portion and then add the remaining portion of reactants to complete the polymerization. This polymerization can be conducted in at least 2 or more portions as may be desired.

The alkyl acrylates which can be used in this invention are those wherein the alkyl portion contains 1 to 4 carbon atoms. These alkyl acrylates include methylacrylate, ethyl acrylate, propyl acrylate, butyl acrylate and the like. Methyl acrylate is preferred because of its ease of saponification to produce the alkali salt of polyacrylic acid.

The acrylate esters having at least one other radical containing monoethylenic unsaturation include alkenyl acrylates, polyacrylate esters and the like. The alkenyl acrylates which can be used are those wherein the alkenyl radical contains from 1 to 6 carbon atoms such as vinyl acrylate, allyl acrylate, butylene acrylate, hexylene acrylate and the like. Typical of the polyacrylate esters include, among others, ethylene glycol dimethacrylate, 1,3-butylene dimethacrylate, trimethylol propane trimethacrylate and the like. The important element of the acrylate ester is that at least a second double bond is available in the radical other than the single available acrylate to permit the possible cross-linking with the starting material alkyl acrylate. The preferred acrylate ester is allyl acrylate. The unique feature of the composition of this invention is the exceptionally small amount of acrylate ester present which provides a cross-linking site for the alkyl acrylate. Amounts of acrylate esters in the range 0.005 to 0.1 weight percent are used and these amounts are exceptionally low when compared to normal cross-linking materials.

The polymerization of alkyl acrylate and acrylate esters is conducted at temperatures in the range from about room temperature to about 100° C. These conditions are controlled to provide polymers having inherent viscosities in the range from about 0.7 to about 2.9, preferably from about 0.7 to about 2.5 measured in 80 percent acetic acid. The inherent viscosity of these compositions are calculated in emulsion form in the following manner: 0.4 milliliter of the uniform copolymer emulsion is weighed and added to a weighed 20 milliliter portion of distilled water and the amount of emulsion to be determined is obtained by weighing the combination. At a temperature of 25° C., sufficient glacial acetic acid is added to the emulsion-water mixture to bring the volume up to 100 millimeters. This combination is shaken well until the solution is homogenous and then permitted to stand for 30 minutes. A 10 millimeter portion of the homogenous mixture is placed into a Cannon-Fenske (series 100) viscometer set in a 25.0° C.±1° C. constant temperature bath and let stand until temperature equilibrium is reached. The flow of the homogenous mixture solution is timed compared to the solvent flow time. Relative viscosity is determined in the following manner:

$$\text{Relative viscosity } (\eta r) = \frac{\text{Solution flow time}}{\text{Solvent flow time}}$$

$$\text{Inherent viscosity} = \frac{\ln \eta r}{\text{Conc. (g./100 ml.) of emulsion} \times \text{Solids of emulsion}}$$

The polymerization reaction is generally carried out in the presence of a polymerization catalyst, which usually will comprise a peroxide or any other free-radical catalyst or catalyst system, with or without other catalytic influences. The chosen catalyst should function effectively at the reaction temperature employed and, in an aqueous system, should be at least partly soluble in water and/or in the monomeric mixture. Preferably a peroxide that is at least partly soluble in water is used.

Included among the peroxide catalysts which can be employed are hydrogen peroxide, water-soluble inorganic per salts such as the persulfates, perphosphates, perborates, and the like, including the alkali metal (sodium, potassium, lithium, etc.) and ammonium persulfates, perphosphates, perborates, and the like. Organic peroxides having at least some solubility in water or in the reaction mass which can be used include acetyl peroxide, benzoyl peroxide, tertiary-butyl hydroperoxide and others of a similar nature.

Among the redox catalyst systems which can be employed are such combinations as mixtures of hydrogen peroxide and an iron salt, hydrogen peroxide and zinc formaldehyde sulfoxylate or similar reducing agents, hydrogen peroxide and a titanous salt, an alkali-metal persulfate, e.g., potassium persulfate, and an alkali-metal bisulfite, e.g., sodium bisulfite, a bromate such as potassium bromate in combination with a bisulfite such as postassium bisulfite, and others known in the art.

The amount of polymerization catalyst employed can be widely varied, e.g., from about 0.5% to about 5%, and more particularly from about 1% to about 2%, by weight, based on the total amount of copolymerizable monomers present, can be used. Obviously, no more catalyst should be used than is required to obtain maximum conversion at lowest catalyst cost.

The term "emulsion" as used herein and in the appended claims is intended to include or mean a true dispersion of particles of copolymer in water, a colloidal dispersion of the copolymers in water, a colloidal dispersion of the copolymer particles in water in which the particles of the copolymer are in the colloidal size range, or true solutions of the copolymer in aqueous solutions of an alkali, e.g., sodium hydroxide, since the copolymer may be present in water under alkaline conditions in any one or more of the above forms.

In forming the emulsion or dispersion there is used an anionic or non-ionic surfactant, dispersing agent, or "wetting agent," and more particularly a "water-soluble" (within which term is included "water-miscible") surfactant, which also may be designated as an emulsifier or as a surface-tension depressant.

Among the anionic surfactants which can be used are the higher-molecular-weight sulfonic acids and salts thereof, e.g., alkyl aryl sulfonates such as isobutyl, di-isobutyl and amyl through dodecyl naphthalene sulfonic acids or their alkalimetal (specifically sodium) salts, sodium lauryl sulfate, the sodium salt of dioctyl sulfosuccinate, and formaldehyde-naphthalene sulfonic acid condensation products.

Non-ionic surfactants which can be employed include polyethoxyethanol derivatives of methylene-linked alkylphenols; sulfur-containing agents such as those made by condensing the required proportion of ethylene oxide with nonyl, dodecyl, tetradecyl, etc., mercaptans or with alkylthiophenols having alkyl groups of from 6 to 15 carbon atoms; ethylene oxide derivatives of long-chain carboxylic acids such as lauric, myristic, palmitic or oleic acids, and the like, or mixtures of acids as those present in tall oil; ethylene oxide condensates of long-chain alcohols such as octyl, decyl, lauryl or cetyl alcohols, and ethylene oxide derivatives of etherified or esterified polyhydroxy compounds having a hydrophobic hydrocarbon chain. The preferred non-ionic surfactant is a relatively long-chain alkylphenoxy(polyethoxy)ethanol, more particularly those having attached to the aromatic nucleus an alkyl group containing from 7 through about 12 carbon atoms. Mixtures of such alkylphenoxy(polyethoxy)ethanols with each other or with other surfactants, including non-ionic surfactants, in any proportions can be used as desired or as conditions may require.

The amount of surfactant employed can be varied considerably, but ordinarily from about 2% to about 12%, more particularly from about 4 to about 10%, by weight, based on the total weight of the copolymerizable ingredients, will be used.

The surfactant aids in effecting emulsification of the monomers, in sustaining the polymerization reaction, and in stabilizing the resulting colloidal dispersion.

The emulsion can also contain a small amount of a protective colloid, and more particularly a non-tonic hydrophilic protective colloid. The amount of such a collid used can range, for example, from about 0.1% to about 2%, and more particularly from about 0.5% to about 1%, by weight, based on the total amount of monomers charged. Among the protective colloids which can be used are water-soluble methyl cellulose, hydroxyethyl cellulose, carboxymethyl cellulose, hydroxyethyl ethers of cellulose, polyvinyl alcohols, including those containing acetate groups (e.g., those containing up to about 10% by weight of acetate groups), polyacrylamide, sodium and other alkali metal polyacrylates, polyvinylpyrrolidone, gum arabic, gum tragacanth, soluble starch, glue, gelatin, water-soluble alginates such as sodium alginate, casein, agar, and the like. The hydroxyethyl ethers of cellulose are especially preferred whenever a protective colloid is to be used.

The alkali hydroxides which can be used to produce the alkali salt of polyacrylic acid include sodium hydroxide, potassium hydroxide, lithium hydroxide and the like. The preferred alkali hydroxide is sodium hydroxide. The amount of alkali hydroxide used in the reaction are determined to provide an amount equivalent to 0.7 to 0.9 mole of alkali per mole of alkylacrylate. In other words the perecntage of saponification would range from 70 to 90 percent. The amount of water used in the saponification would equal that amount to provide a solution having solids in the range from about 8 to about 12 percent.

The major use of the alkali polyacrylate thickeners, especially sodium polyacrylate thickeners of this invention is in carpet backcoatings as an adhesive. These backcoatings directly affects the properties of a carpet in that it contributes to the hand of the carpet, improves tuft retention, eliminates fraying of cut edges, increases dimensional stability among other advantages.

The following examples serves to illustrate the advantages of the invention without limiting the same.

EXAMPLE 1 (CONTROL)

Into a reaction flask is placed the following:

| | Grams |
|---|---|
| Deionized water | 744 |
| Nonionic surfactant (reaction product of 1 mole nonyl phenol and about 40 moles ethylene oxide) | 10.6 |
| Methyl acrylate | 125 |
| Sodium persulfate | 0.5 |

The above mixture was initially heated to 85° C. then cooled to 60° C. At this point the same amount of the above ingredients except for the water was additionally added to the mixture and temperature was held at 85° C. for one-half hour. The product had a solids content of 24.4% and an inherent viscosity of 0.95.

To 500 grams of the above emulsion at room temperature was added 509.6 grams deionized water and 9.1 grams sodium hydroxide. This mixture was heated to 75° C. with stirring. At this point, the mixture of 400.4 grams deionized water and 36.3 grams sodium hydroxide was added in a uniform rate so that its addition required 1 hour for the addition of the mixture. This produced an 80 mole percent saponification and had a solids content of 10%.

The resulting sodium polyacrylate solution was evaluated for its thickening power as follows:

A carboxylated butadiene/styrene latex (Firestone FR200) was diluted with water to 16 percent solids. To 250 grams of this diluted latex was added 15 grams of the sodium polyacrylate solution above. The mixture was mechanically stirred for a few minutes to effect homogeneity and the Brookfield viscosity was measured immediately using the #4 spindle at 20 r.p.m. The viscosity was re-measured after standing overnight. Results are indicated in Table I below.

EXAMPLE 2

The same procedure was followed as in Example 1 except the methyl acrylate feed was prepared containing 0.03 percent allyl acrylate. Results are indicated in Table I below.

EXAMPLE 3

The same procedure was followed as in Example 1 except the mehyl acrylate feed was prepared containing 0.05 percent allyl acrylate. Results are indicated in Table I below.

EXAMPLE 4

The same procedure was followed as in Example 1 except the methyl acrylate feed was prepared containing 0.07 percent allyl acrylate. Results are indicated in Table I below.

EXAMPLE 5

The same procedure was followed as in Example 1 except the methyl acrylate feed was prepared containing 0.01 percent ethylene glycol dimethacrylate. Results are indicated in Table I below.

EXAMPLE 6

The same procedure was followed as in Example 1 except the methyl acrylate feed was prepared containing 0.02 percent ethylene glycol dimethacrylate. Results are indicated in Table I below.

EXAMPLE 7

The same procedure was followed as in Example 1 except the methyl acrylate feed was prepared containing 0.05 percent ethylene glycol dimethacrylate. Results are indicated in Table I below.

EXAMPLE 8

The same procedure was followed as in Example 1 except the methyl acrylate feed was prepared containing 0.01 percent 1,3-butylene dimethacrylate. Results are indicated in Table I below.

EXAMPLE 9

The same procedure was followed as in Example 1 except the methyl acrylate feed was prepared containing 0.02 percent 1,3-butylene dimethacrylate. Results are indicated in Table I below.

EXAMPLE 10

The same procedure was followed as in Example 1 except the methyl acrylate feed was prepared containing 0.03 percent 1,3-butylene dimethacrylate. Results are indicated in Table I below.

EXAMPLE 11

The same procedure was followed as in Example 1 except the methyl acrylate feed was prepared containing 0.05 percent 1,3-butylene dimethacrylate. Results are indicated in Table I below.

EXAMPLE 12

The same procedure was followed as in Example 1 except the methyl acrylate feed was prepared containing 0.01 percent vinyl acrylate. Results are indicated in Table I below.

TABLE I

The following table shows the effect of the addition of the compounds of this invention to methyl acrylate monomer on the thickening ability of the resulting sodium polyacrylate:

| Example | Compound added | Percent by Wt. | Viscosity of thickened emulsion (cps.) | |
|---|---|---|---|---|
| | | | After mixing | After standing |
| 1 | None | | 700 | 750 |
| 2 | Allyl acrylate | .03 | 4,670 | 5,280 |
| 3 | do | .05 | 3,590 | 3,660 |
| 4 | do | .07 | 1,120 | 1,250 |
| 5 | Ethylene glycol dimethacrylate | .01 | 1,110 | 1,450 |
| 6 | do | .02 | 1,610 | 2,050 |
| 7 | do | .05 | 1,270 | 1,750 |
| 8 | 1,3 butylene dimethacrylate | .01 | 1,560 | 2,080 |
| 9 | do | .02 | 1,380 | 1,700 |
| 10 | do | .03 | 2,000 | 2,330 |
| 11 | do | .05 | 1,850 | 2,180 |
| 12 | Vinyl Acrylate | .01 | 1,720 | 2,100 |

It should be noted from the results in αable I that sodium polyacrylate made by the procedure in Example 1 and not containing an additive does have thickening properties. Examples 2 through 12 demonstrate that sodium polyacrylate containing the described additives provided improved thickening properties.

It is to be understood that the foregoing description is merely illustrative and preferred embodiments of the invention of which many variations may be made by those skilled in the art within the scope of the following claims without departing from the spirit thereof.

What is claimed is:

1. An improved water soluble polyacrylate thickener comprising an alkali salt of polyacrylic acid, said polyacrylic acid produced from saponification with alkali hydroxide of a polyalkyl acrylate having an inherent viscosity in the range from about 0.7 to about 2.9 measured in 80 percent acetic acid at 25° C. and the alkyl radical containing from 1 to 4 carbon atoms, said polyalkyl acrylate derived from the polymerization of an acrylate ester having at least one radical other than the single available acrylate having monoethylenic unsaturation which provides a cross-linking site for the alkyl acrylate, said acrylate ester being present in amounts ranging from about 0.005 to about 0.1 weight percent based on the polyalkyl acrylate used, the alkali content of said alkali salt of polyacrylic acid ranges from about 0.7 to 0.9 mole per mole polyalkyly acrylate.

2. The product of claim 1 wherein the polyalkyl acrylate is polymethyl acrylate, the alkali metal is sodium, and the acrylate ester is allyl acrylate.

3. The product of claim 2 wherein the inherent viscosity of polymethyl acrylate is from about 0.7 to about 2.5.

4. A copolymer of an alkyl acrylate wherein the alkyl radical contains 1 to 4 carbon atoms and an acrylate ester containing at least one radical other than the single available acrylate having monoethylenic unsaturation which provides a cross-linking site for the alkyl acrylate, said ester being present in amounts ranging from about 0.005 to about 0.1 weight percent based on the alkyl acrylate used, said copolymer having an inherent viscosity in the range from about 0.7 to about 2.9 measured in acetic acid.

5. The copolymer of claim 4 wherein the alkyl acrylate is methyl acrylate and the acrylate ester is allyl acrylate.

6. The copolymer of claim 5 having an inherent viscosity of from about 0.7 to about 2.5 measured in 80 percent acetic acid at 25°.

7. A process for producing an emulsion copolymer of an alkyl acrylate wherein the alkyl radical contains from 1 to 4 carbon atoms and an acrylate ester having at least one radical other than the single available acrylate having monoethylenic unsaturation which provides a cross-linking site for the alkyl acrylate, said acrylate ester present in amounts ranging from about 0.005 to about 0.1 weight percent based on the polyalkyl acrylate which comprises reacting said alkyl acrylate and said acrylate ester in the presence of water, a water soluble polymerization catalyst and a surfactant at temperatures in the range from about room temperature to about 100° C. to produce a copolymer having an inherent viscosity of from about 0.7 to about 2.9.

8. The process of claim 7 wherein the polymerization is conducted in at least two parts by initially polymerizing one portion of the reactants and polymerizing the remaining portion in the presence of the earlier polymerized material.

9. The process of claim 8 wherein the alkyl acrylate is methylacrylate and the acrylate ester is allyl acrylate.

10. The process of claim 9 wherein the inherent viscosity of the copolymer is from about 0.7 to about 2.5.

11. A process for producing an improved water soluble polyacrylate thickener which comprises adding to the emulsion as produced by the process as set forth in claim 8, an alkali metal hydroxide in an amount equivalent to 0.7 to 0.9 mole of alkali per mole of the alkyl acrylate and water in amounts calculated to produce a solution containing from about 8 to about 12 percent solids, said alkali metal hydroxide and water added to said emulsion in the following manner: 10 to 40 percent of the alkali metal hydroxide and 40 to 70 percent of the water is added initially to the emulsion at room temperature, the emulsion is then heated to a temperature in the range from about 60° C. to about 90° C., at this temperature the remaining alkali metal hydroxide and water is added to the emulsion at a uniform rate over a period of time sufficient to produce a uniformly saponified product.

12. The process of claim 11 wherein the alkali metal hydroxide is sodium hydroxide, the polyalkyl acrylate is polymethyl acrylate and the acrylate ester is allyl acrylate.

References Cited

UNITED STATES PATENTS

| | | | |
|---|---|---|---|
| 2,400,477 | 5/1946 | Atwood | 260—83 |
| 2,456,647 | 12/1948 | Rehberg et al. | 260—79 |
| 3,154,600 | 10/1964 | Munn | 260—884 |
| 3,219,610 | 11/1965 | Tillson | 260—29.6 |

JOSEPH L. SCHOFER, Primary Examiner

J. C. HAIGHT, Assistant Examiner

U.S. Cl. X.R.

260—80, 81